United States Patent
Hendrickson

[15] 3,703,944
[45] Nov. 28, 1972

[54] DISK PARKING AND SERVICE BRAKE HAVING SERVO ACTION ON PARKING BRAKE ONLY

[72] Inventor: Paul G. Hendrickson, Ann Arbor, Mich.

[73] Assignee: Kelsey-Hayes Company, Romulus, Mich.

[22] Filed: June 1, 1970

[21] Appl. No.: 42,310

[52] U.S. Cl. ............... 188/72.2, 188/72.6, 188/106 F
[51] Int. Cl. ............................................ F16d 55/224
[58] Field of Search.......... 188/71.8, 72.2, 72.6, 72.9, 188/106 F, 196 P

[56] References Cited

UNITED STATES PATENTS

| | | | |
|---|---|---|---|
| 3,207,267 | 9/1965 | Beuchle et al. | 188/72.2 |
| 3,406,793 | 10/1968 | Buyze | 188/72.2 |
| 3,532,196 | 10/1970 | Winge | 188/72.2 X |

Primary Examiner—Duane A. Reger
Attorney—Harness, Dickey & Pierce

[57] ABSTRACT

A sliding caliper type disk brake assembly including a directly actuated brake pad that is movably supported relative to the caliper assembly and an indirectly actuated brake pad that is fixed relative to the caliper assembly. A hydraulic piston and mechanical actuator are provided for moving the directly actuated brake pad into engagement with the associated rotor braking surface and for generating a reactive force to slide the caliper and actuate the indirectly actuated brake pad. Interposed between the hydraulic piston and the directly actuated brake pad are a pair of transversely movable members having inclined surfaces for generating a servo or self-energizing force that is effective only upon mechanical actuation.

11 Claims, 4 Drawing Figures

PATENTED NOV 28 1972 3,703,944

INVENTOR.
Paul G. Hendrickson
BY
Harness, Dickey & Pierce
ATTORNEYS.

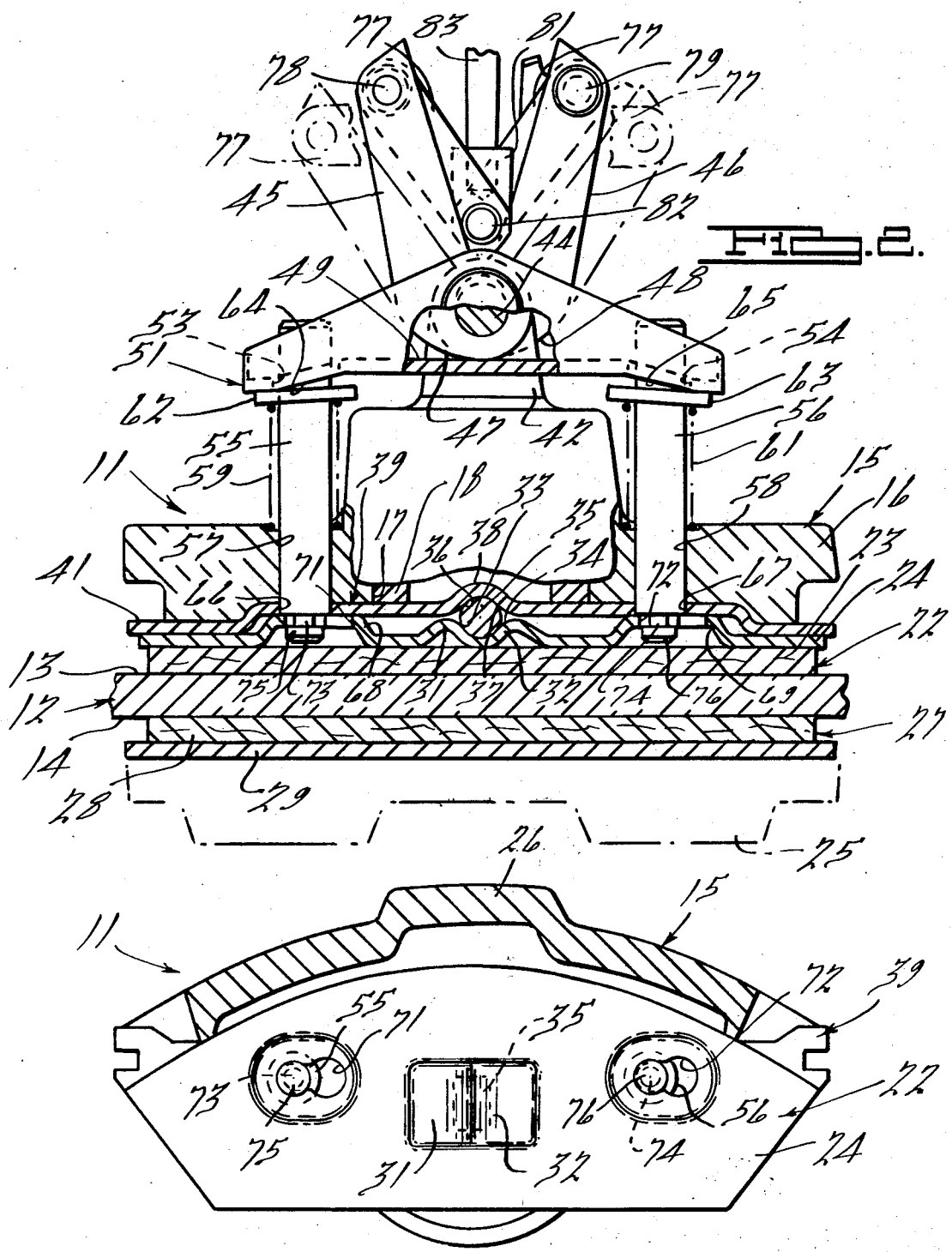

DISK PARKING AND SERVICE BRAKE HAVING SERVO ACTION ON PARKING BRAKE ONLY

BACKGROUND OF THE INVENTION

This invention relates to a brake assembly and more particularly to a brake assembly having an improved mechanical and hydraulic actuator.

In vehicle brake assemblies, it is common to provide two types of actuators on at least certain of the brake shoes. A hydraulic actuator is employed for service application and a mechanical actuator is employed for use as a parking brake. With the wide use of power assistance on the service application, there has been a tendency to eliminate or minimize self-energizing or servo action on the brake shoe. This results in a considerable loss in braking power when the brakes are mechanically applied. This problem is particularly prevalent with disk brake assemblies since such brakes have little or no self-energization.

It is, therefore, a principal object of this invention to provide a brake assembly having two different types of actuators and in which a self-energization is provided in only one of the actuating systems.

It is another object of this invention to provide a brake assembly having a hydraulic and a mechanical actuator that are operative on a single brake shoe and in which a servo action is accomplished only when the brake shoe is operated mechanically.

Although disk brake assemblies are now finding wide acceptance for use in connection with the front wheels of a motor vehicle, the application of four-wheel disk brakes is relatively limited. One reason for the limited use of disk brakes on all wheels is the difficulty and expense of providing an effective parking brake assembly for such brakes.

It is, however, another principal object of this invention to provide an improved, combined service and parking disk brake assembly.

SUMMARY OF THE INVENTION

A brake assembly embodying this invention has a brake shoe and first and second actuating means for independently operating the brake shoe. Means are provided for exerting a self-energizing force on the brake shoe only when the brake shoe is operated by the second actuating means.

BRIEF DESCRIPTION OF THE DRAWINGS

FIG. 2 is a view, in part plan and in part sectional, taken along the line 2—2 of FIG. 1.

FIG. 3 is a cross-sectional view taken along the line 3—3 of FIG. 1.

DETAILED DESCRIPTION OF THE PREFERRED EMBODIMENT

Figure 1:
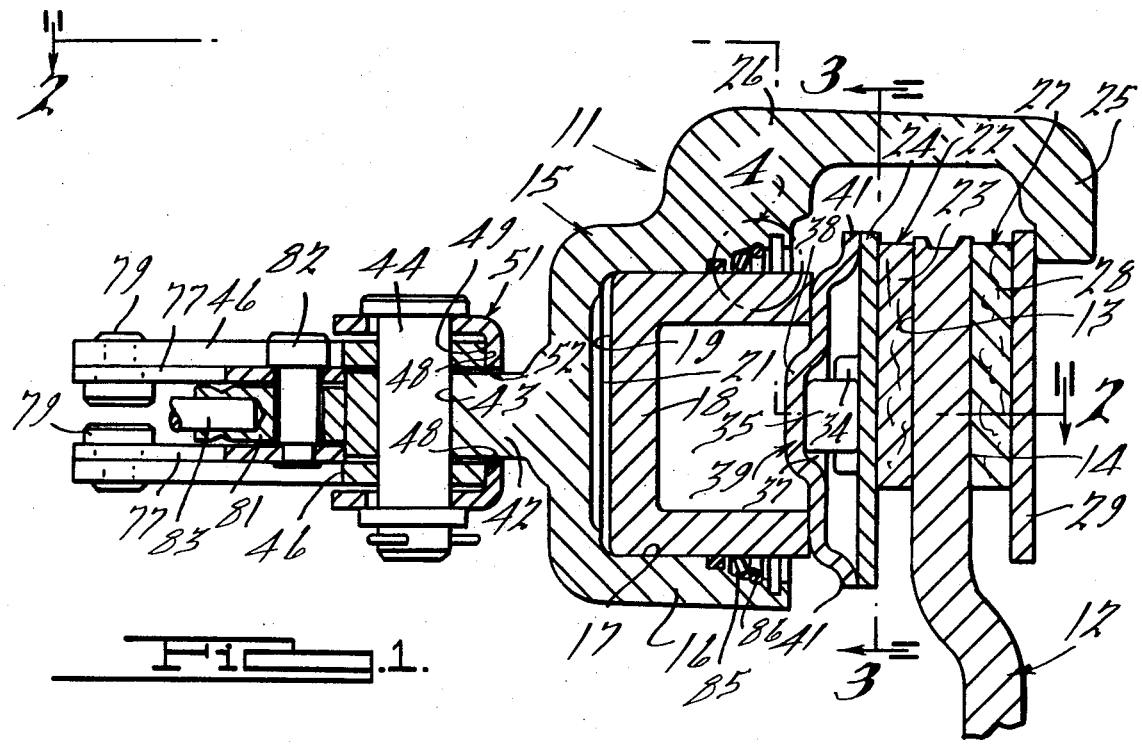
FIG. 1 is a cross-sectional view of a disk brake assembly embodying this invention and is taken along a plane that includes the axis of rotation of the associated brake rotor.

The reference numeral 11 indicates generally a disk brake assembly embodying this invention. The disk brake assembly 11 is particularly adapted for use as a rear wheel brake in a motor vehicle for braking the rotation of a rotor 12 that is fixed for rotation with the vehicle wheel (not shown). The rotor 12 has oppositely facing braking surfaces 13 and 14 which surfaces extend in a plane perpendicular to the axis of rotation of the rotor 12.

The brake assembly 11 is of the sliding caliper type and includes a caliper assembly, indicated generally by the reference numeral 15, which caliper assembly is supported for sliding movement in a direction perpendicular to the rotor braking surfaces 13 and 14, and which is held against rotation about the axis of rotation of the rotor 12 in any known manner. The caliper assembly 15 includes a first leg 16 that is juxtaposed to the disk braking surface 13 and in which a bore 17 is formed. A hydraulically operated piston 18 is slidably supported in the bore 17 and has a head portion 19 that is exposed to a fluid cavity 21. The cavity 21 is adapted to be pressurized in any known manner for urging the piston 18 to the right as viewed in FIG. 1.

This movement is transmitted to a primary brake shoe or pad, indicated generally by the reference numeral 22, in a manner which will become more apparent as this description proceeds. The brake shoe or pad 22 has a frictional lining 23 that is adapted to frictional engagement with the rotor braking surface 13 when the pad 22 is actuated. The lining 23 is bonded or otherwise secured to a rigid backing plate 24.

The caliper assembly 15 has a second leg 25 that is juxtaposed to the rotor braking surface 14 and which is connected to the leg 16 by an intermediate portion 26. The leg 25 of the caliper assembly 15 is engaged with a reactive brake shoe or pad, indicated generally by the reference numeral 27. The brake shoe or pad 27 has a frictional lining 28 that is adapted to engage the rotor braking surface 14 when the brake pad 27 is actuated. The friction lining 28 is bonded or otherwise secured to a rigid backing plate 29. The blacking plate 29 is abuttingly engaged by the caliper leg 25 and may be held against rotation by its engagement with the leg 25 in any known manner. Alternately, the brake pad 27 may be restrained against rotation in any other manner known in this art. When the piston 18 is actuated, a reactive force will be exerted upon the caliper assembly 15 that causes it to be shifted to the left as viewed in FIG. 1. This motion is transmitted through the brake leg 25 to the brake pad 27 to actuate it in a manner which is known in this art.

Referring again to the primary brake pad 22 and its association with the piston 18, the backing plate 24 is formed with a pair of embossments 31 and 32 that define converging inclined surfaces 33 and 34, respectively, on the side of the backing plate 24, adjacent the piston 18. A roller 35 having an axis that extends perpendicularly to the axis of rotation of the rotor 12 is captured between the inclined surfaces 33 and 34. At its other side, the roller 35 is restrained between a pair of inclined surfaces 36 and 37 of an embossment 38 formed in a plate-like member, indicated generally by the reference numeral 39. The member 39 has an offset flange 41 formed around its outer periphery, which flange is engaged with the outer periphery of the backing plate 24. Around the embossment 38, the member 39 is engaged by the piston 18.

It should be readily apparent that when the piston 18 is energized, the member 39 will be urged toward the rotor braking surface 13. The engagement of the flange 41 with the backing plate 24 and the engagement through the roller 35 with the inclined surfaces 33 and 34 will transmit the force exerted by the piston 18 on the member 39 to the backing plate 24 and primary brake pad 22. This will bring the frictional lining 23 into frictional engagement with the rotor braking surface 13.

When the brake pad 22 is engaged with the rotor 12, there is a force exerted on the brake pad tending it to rotate in the same direction of the rotor 12. This rotational force, sometimes termed braking torque, is resisted by holding the plate 39 against rotation. This may be done by having it engaged with a separate torque taking member (not shown) or through some engagement of the member 39 with the caliper assembly 15. Since the member 39 is held against rotation and this member is held against movement away from the backing plate 24 by the force of the piston 18, the roller 35 will transmit the braking torque from the brake pad 22 to the member 39 where it is absorbed.

The brake assembly 11, in addition to being hydraulically actuated by the piston 18, may be mechanically actuated in the manner now to be described. An embossment 42 extends outwardly from the caliper leg 16 adjacent the bore 17. The embossment 42 is formed with a bore 43 that extends transversely to the bore 17. A pin 44 is supported within the bore 43 and has portions that extend on either side of the embossment 42. Pairs of levers 45 and 46 are journaled on the portions of the pin 44 that extend above and below the boss 42. These pairs of levers 45 and 46 have cam surfaces 47 and 48, respectively, that are engaged with the rear surface 49 of an actuating member, indicated generally by the reference numeral 51. The actuating member 51 has an opening 52 in its surface 49, which opening passes the boss 42.

The actuating member 51 has a pair of apertures 53 and 54 at its outer side (FIG. 2), which aperture passes actuating pins 55 and 56, respectively. The pins 55 and 56 are journaled in bores 57 and 58 formed in the caliper leg 16 on opposite sides of the bore 17. Coil springs 59 and 61 encircle the pins 55 and 56 and bear against canted washers 62 and 63. The springs urge the washers 62 and 63 against the actuating member 51. It will be noted that the adjacent surfaces of the actuating member 51 are offset, as at 64 and 65, so that the washers 62 and 63 will be canted slightly relative to the actuating pins 55 and 56. In this manner, the washers 62 and 63 act as one-way clutches so that movement of the actuating member 51 toward the rotor braking surface 13 will be transmitted through the washers 62 and 63 into movement of pins 55 and 56 in the same direction. The washers 62 and 63 are, however, free to move relative to the pins 55 and 56 in the opposite direction for a reason which will become more apparent as this description proceeds.

Adjacent the caliper bores 57 and 58, the actuating pins 55 and 56 pass through apertures 66 and 67 formed in the member 39. Adjacent the apertures 66 and 67, the backing plate 24 is formed with embossments 68 and 69. The embossments 68 and 69 are formed with elongated key-shaped slots 71 and 72. The slots 71 and 72 pass reduced diameter portions 73 and 74 of the actuating pins 55 and 56. Headed portions 75 and 76 of the pins 55 and 56 are disposed adjacent the opposite side of the embossments 68 and 69. The portions 75 and 76 are cylindrical and are of sufficiently small diameter to pass through the enlarged portions of the slots 71 and 72. After the portions 75 and 76 are inserted through the enlarged portions of the slots 71 and 72, the backing plate 24 is slid relative to the pins 55 and 56 to the positions shown in FIG. 2 so as to axially affix the actuating pins 55 and 56 relative to the backing plate 24.

Upper and lower pairs of operating levers and 77 are pivotally connected to the outer legs of the respective pairs of actuating levers 45 and 46 by pivot pins 78 and 79. The opposite ends of the operating levers and 77 are pivotally connected to each other and to a trunnion 81 by means of a pivot pin 82. The trunnion 81 is, in turn, connected to a wire actuator 83. The wire actuator, in turn, extends to a parking brake actuator (not shown) located in the interior of the associated vehicle.

FIG. 2 illustrates the parking brake assembly in its released position. Before describing the operation of the parking brake, the effect of the hydraulic actuator on the parking brake actuating mechanism will be described. It has been previously noted that the backing plate 24 and member 39 move together and away from the caliper assembly 15 when the piston 18 is actuated. This movement is transmitted to the actuating pins 55 and 56. The pins 55 and 56, therefore, move relative to the caliper assembly 15 and relative to the actuating member 51 that is carried by the caliper assembly 15. The amount of relative movement is magnified since, however, as has already been noted, the caliper assembly 15 is slidable relative to the rotor 12. The springs 59 and 61 will tend to hold the washers 62 and 63 from movement with the actuating member 51. Unless sufficient wear of the linings 23 and 28 has taken place, the washers 62 and 63 will move slightly away from the actuating member 51 during hydraulic operation. If there has been sufficient wear on the linings, however, the washers 62 and 73 will shift slightly relative to the pins 55 and 56 to accomplish an automatic adjustment in the parking brake mechanism.

Considering now the actuation via the parking brake mechanism, a tensile force is exerted upon the wire actuator 83. This tensile force is transmitted to the trunnion 81 and causes the operating levers 77 to pivot from the solid line position shown in FIG. 2 to the dotted line position. When this occurs, the actuating levers 45 and 46 pivot about the pivot pin 44. The cam surfaces 47 and 48 are shaped so as to exert a force on the actuating member 51 when this pivotal movement occurs. This force is transmitted through the washers 62 and 63 and pins 55 and 56 to the brake pad 22. At the same time, a reactive force is exerted upon the caliper assembly 15 that causes it to shift and actuate the brake pad 27.

When the brake pads 22 and 27 are operated by the parking brake assembly in the manner described, the backing plate 24 will tend to move slightly away from the member 39. Also, as has been previously noted, the brake pad 22 and its backing plate 24 tend to rotate in the same direction on the rotor 12. Depending upon the degree of rotation, the backing plate 24 will then shift relative to the member 39 shown along the axis of the bore 17 and perpendicular to this axis and in the plane of FIG. 2. The elongation of the slots 71 and 72 permits this movement. Upon this relative movement, the roller 35 will be displaced and will be loaded between the surfaces 34 and 36 or surfaces 33 and 37. The action of the roller 35 will then hold the backing plate 24 against further rotation. It will be noted, however, that the force resisting this rotation has a component in the axial direction and toward the rotor braking surface 13. This component will effect a self-energizing or servo action on the brake pad 22; thus, magnifying the manual force exerted on the brake pad. Thus, a servo action is accomplished but only upon mechanical actuation of the brake pads.

Figure 4:
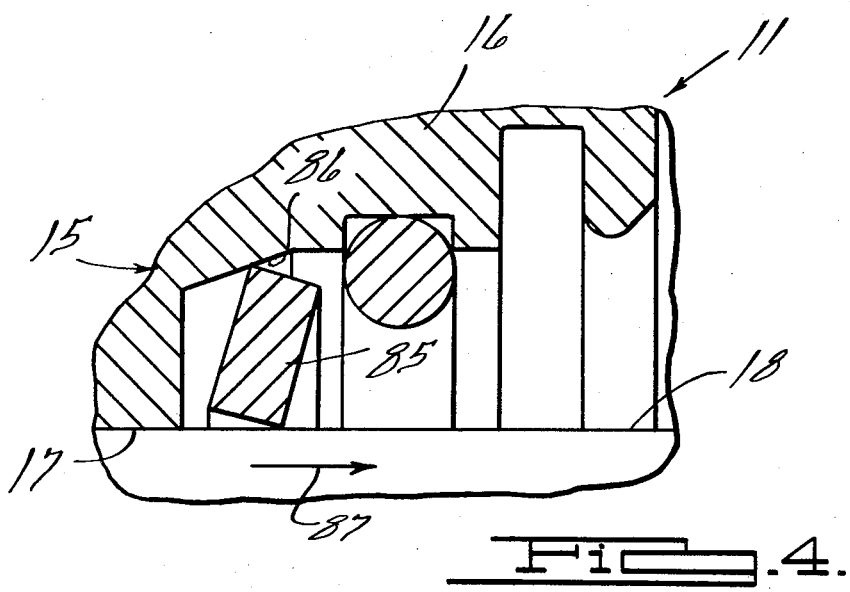
FIG. 4 is an enlarged view of the area encompassed by the circle 4 in FIG. 1.

In order to insure an effective backup for the plate 39 during the servo action, a canted washer 85 (FIG. 4) is interposed between the piston 18 and a groove 86 formed in the caliper housing 15 adjacent the outer end of its bore 17. The canted washer 85 permits free movement of the piston 18 relative to the bore 17 in the direction of the arrow 87. Thus, the washer 85 will not interfere with normal hydraulic action of the piston 18. The washer 85 will also permit normal retraction of the piston 18. Any excess movement in a direction opposite to the direction of arrow 87 will, however, be precluded by the cant of the washer 85 and its engagement with the caliper groove 86 and piston 18. Thus, the piston 18 provides an effective backup for the member 39 during mechanical actuation.

What is claimed is:

1. A disk brake assembly adapted to brake the rotation of a brake rotor, said brake assembly comprising a brake shoe positioned on one side of the rotor, first actuating means positioned on the one side of the rotor for operating said brake shoe, second actuating means positioned on the one side of the rotor for operating said brake shoe, and means for exerting a self-energizing force upon said brake shoe only when said brake shoe is operated by said second actuating means.

2. A brake assembly as set forth in claim 1 wherein the last named means comprises means interposed between the first actuating means and the brake shoe.

3. A brake assembly as set forth in claim 2 wherein the first actuating means includes a hydraulically operated piston and the second actuating means comprises a mechanically actuated member.

4. A brake assembly as set forth in claim 1 wherein the first actuating means comprises a hydraulically operated piston and the second actuating means includes a mechanically actuated member.

5. A brake assembly as set forth in claim 4 further including means for precluding reverse movement of the hydraulically operated piston when a force is applied thereto.

6. A brake assembly as set forth in claim 1 wherein the last named means comprises means defining cooperating surfaces inclined with respect to the frictional lining surface of the brake shoe and interposed between the first actuating means and said brake shoe.

7. A disk brake assembly as set forth in claim 6 wherein the first actuating means comprises a hydraulically operated piston and the second actuating means includes a mechanically actuated member, and further including means for preventing reverse movement of said piston when a force is applied thereto through the cooperating inclined surfaces.

8. In a disk brake assembly including a rotor supported for rotation about an axis and having braking surfaces, a brake pad having a frictional lining juxtaposed to said rotor brake surfaces and a backing plate, a caliper assembly associated with said brake pad and defining a cylinder bore extending substantially perpendicular to said rotor braking surface, a piston slidably supported in said cylinder bore, a member interposed between said brake pad backing plate and said piston and engaged by said piston, said member and said backing plate having related, angularly disposed surfaces, a roller interposed between said surfaces of said member and said backing plate, means for holding said member against rotation, an actuating pin slidably supported by said caliper and engaged with said backing plate for actuating said brake pad, and means for providing for transverse movement between said actuating pin and said backing plate for effecting axial movement between said backing plate and said member upon engagement of said brake pad with said rotor braking surface for effecting a servo action on said brake pad when actuated by said actuating pin.

9. A sliding caliper type disk brake assembly for braking the rotation of an associated rotor, said brake assembly comprising a caliper adapted to be supported for sliding movement in a direction parallel to the axis of rotation of the associated rotor, a first brake shoe supported for movement relative to said caliper and adapted to be positioned on one side of the rotor, a second brake shoe fixed against movement relative to said caliper and adapted to be positioned on the other side of the rotor, first actuating means for moving said first brake shoe relative to said caliper and into engagement with the associated rotor braking surface and for creating a reactive force upon said caliper for sliding said caliper relative to the rotor to bring said second brake shoe into engagement with the associated rotor braking surface, second actuating means for moving said first brake shoe relative to said caliper into engagement with the associated rotor braking surface and for creating a reactive force upon said caliper for sliding said caliper relative to the rotor to bring said second brake shoe into engagement with the associated rotor braking surface, and means for exerting a self-energizing force upon said first brake shoe only when said first shoe is operated by said second actuating means.

10. A sliding caliper type disk brake assembly as set forth in claim 9 wherein the first actuating means comprises a hydraulically operated piston and the second actuating means comprises a mechanically actuated member.

11. A sliding caliper type disk brake assembly as set forth in claim 10 further including means for precluding reverse movement of the hydraulically operated piston when a force is applied thereto.

* * * * *